United States Patent
Balcou

(10) Patent No.: US 9,647,412 B2
(45) Date of Patent: May 9, 2017

(54) METHOD FOR GENERATING FREE ELECTRONS AND FREE-ELECTRON LASER SYSTEM USING THE INTERACTION WITH A LASER UNDULATOR

(75) Inventor: Philippe Balcou, Talence (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 760 days.

(21) Appl. No.: 13/319,611

(22) PCT Filed: May 7, 2010

(86) PCT No.: PCT/FR2010/050880
§ 371 (c)(1),
(2), (4) Date: Jan. 10, 2012

(87) PCT Pub. No.: WO2010/130924
PCT Pub. Date: Nov. 18, 2010

(65) Prior Publication Data
US 2012/0106577 A1 May 3, 2012

(30) Foreign Application Priority Data

May 15, 2009 (FR) .................................... 09 02372

(51) Int. Cl.
*H01S 3/09* (2006.01)
*H05G 2/00* (2006.01)
(Continued)

(52) U.S. Cl.
CPC ............ *H01S 3/0903* (2013.01); *H05G 2/00* (2013.01); *H01S 3/30* (2013.01); *H01S 4/00* (2013.01)

(58) Field of Classification Search
CPC ............ H01S 3/0903; H01S 4/00; H05G 2/00
(Continued)

(56) References Cited

U.S. PATENT DOCUMENTS 5,247,562 A 9/1993 Steinbach
5,822,342 A * 10/1998 Suzuki et al. .................... 372/2
(Continued)

OTHER PUBLICATIONS

Kupersztych, Joseph et al.; "Laser-driven free-election laser via the relativistic aberration of light rays;" Journal of Physics B (Atomic, Molecular and Optical Physics) UK, vol. 27, No. 1, Jan. 14, 1994; XP-002562358; pp. L33-L39.
(Continued)

*Primary Examiner* — Marcia Golub-Miller
(74) *Attorney, Agent, or Firm* — Harness, Dickey & Pierce, P.L.C.

(57) ABSTRACT

The disclosure relates to a free-electron laser system and a method for generating a packet of relativistic electrons capable of propagating in a first propagation direction (Oz), and a device for generating an undulator beam capable of interacting with the packet of relativistic electrons. In the system, the undulator beam results from combining, at an interaction area through which the propagation direction (Oz) of the packet passes, at least two laser beams propagating in different directions and each of which has at least one non-zero component in a plane orthogonal to the propagation direction (Oz) of the packet. The disclosure also relates to a method for generating a free-electron laser beam involving trapping and guiding a packet of relativistic electrons injected into an interaction area and implementing such a free-electron laser system.

28 Claims, 4 Drawing Sheets

(51) Int. Cl.
*H01S 3/30* (2006.01)
*H01S 4/00* (2006.01)

(58) Field of Classification Search
USPC .......................................................... 372/2
See application file for complete search history.

(56) References Cited

U.S. PATENT DOCUMENTS

| | | | |
|---|---|---|---|
| 7,321,604 B2* | 1/2008 | Umstadter et al. | 372/2 |
| 2005/0147147 A1 | 7/2005 | Umstadter et al. | |
| 2014/0314114 A1* | 10/2014 | Almasi et al. | 372/74 |

OTHER PUBLICATIONS

Kupersztych, Joseph; "Frequency up-conversion and amplification of laser radiation with use of laser and electron beams: Kapitsa-dirac free-electron laser;" Physical Review Letters USA, vol. 70, No. 6, Feb. 8, 1993; XP-002562359; pp. 770-773.

Federov, M.V. et al.; "Free-electron laser based on the effect of channeling in an intense standing light wave;" Applied Physics Leters, AIP, American Institute of Physics, Melville, NY, US, vol. 53, No. 5, Aug. 1, 1988; XP000020100; pp. 353-354.

Bertolotti, M. and Sibilia, C.; Coherent y radiation production by interaction between a relativistic electron beam and two interfering laser fields; vol. 26, No. 3; Dec. 1982.

Andriyash, I. A., et al. X-Ray Amplification from a Raman Free-Electron Laser. Physical Review Letters. pp. 1-5. American Physical Society. Published Dec. 14, 2012.

d'Humieres, E., et al. Compact XFEL Schemes. Free Electron Lasers. pp. 91-118. Published Mar. 14, 2012.

Dabagov, S. B., et al. Channeling of Electrons in a Crossed Laser Field. Physical Review Special Topics—Accelerators and Beams. pp. 1-8. American Physical Society. Published Jun. 9, 2015.

Andriyash, I. A., et al. Betatron Emission from Relativistic Electrons in a High Intensity Optical Lattice. Physical Review Special Topics—Accelerators and Beams. pp. 1-12. American Physical Society. Published Oct. 30, 2013.

Balcou, Ph., Proposal for a Raman X-ray Free Electron Laser, The European Physical Journal D, Published Online Jul. 16, 2010.

\* cited by examiner

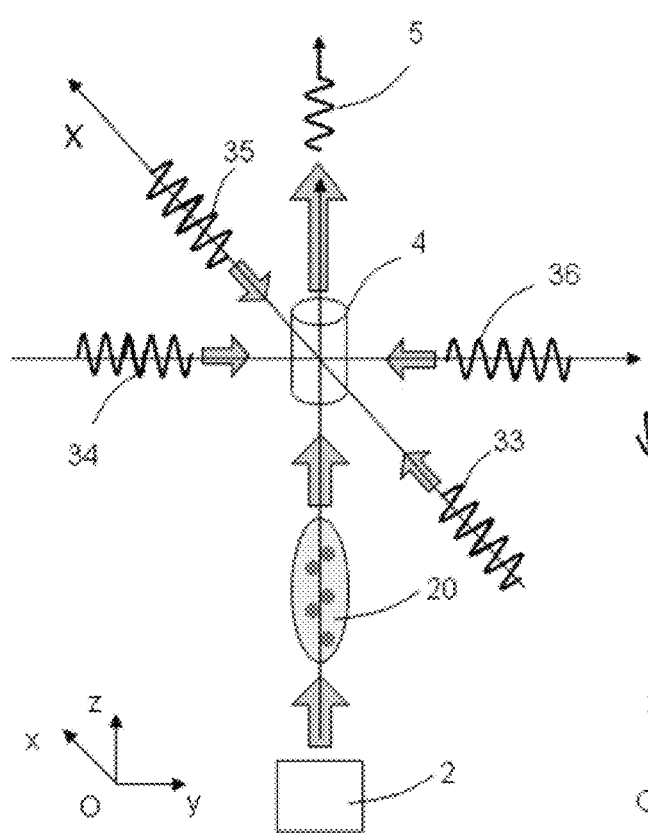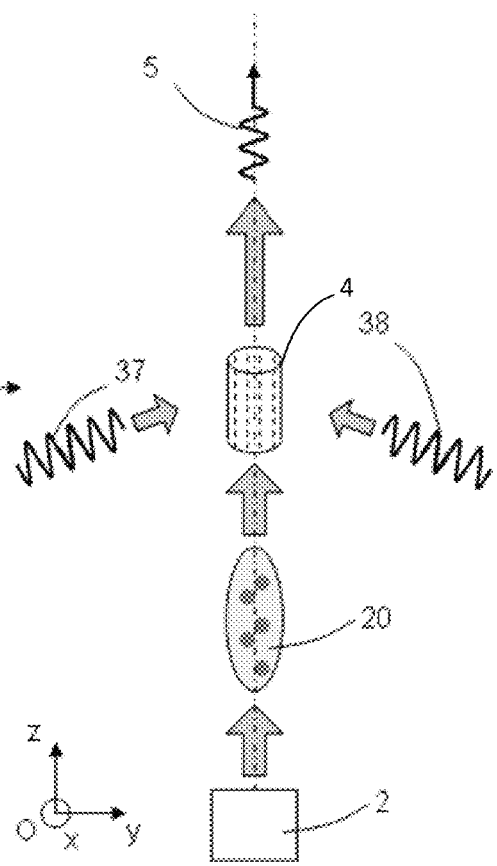

METHOD FOR GENERATING FREE ELECTRONS AND FREE-ELECTRON LASER SYSTEM USING THE INTERACTION WITH A LASER UNDULATOR

CROSS-REFERENCE TO RELATED APPLICATIONS

This application is a National Phase Entry of International Application No. PCT/FR2010/050880, filed on May 7, 2010, which claims priority to French Patent Application Serial No. 09/02372, filed on May 15, 2009, both of which are incorporated by reference herein.

BACKGROUND AND SUMMARY

The present invention relates to a free-electron laser system and a method for generating a free-electron laser beam through the interaction with a laser undulator. The present invention relates to the field of free-electron laser beam generation capable of providing very short-length wave radiation in a spectral range from far ultra-violet to gamma rays. It more particularly relates to a free-electron laser system, comprising means for generating a packet of relativistic electrons capable of propagating in a propagation direction and means for generating an undulator beam capable of interacting with the packet of relativistic electrons. It also relates to a method for generating a free-electron laser beam, including a step of generating a packet of relativistic electrons capable of propagating in a propagation direction, and a step of generating an undulator beam capable of interacting with the packet of relativistic electrons.

In this field, the prior art comprises different types of X-ray lasers amongst which the most currently used are plasma medium X-ray lasers, an example of which is described in U.S. Pat. No. 6,693,989. A system for generating radiation in the X-ray spectral field comprises laser pulse and gaseous state atom packet generators. The laser pulse is directed inside the atom packet such as to produce an atomic excitation, in order to retrieve selected atomic electrons without retrieving all the electrons. A population inversion is thus generated and a non-linear, confined mode radiation propagation area in the X-ray spectral field is established. The density of the atom packet in the gaseous state is controlled in this thus established propagation area such as to ensure that X-ray propagation does not cease.

The invention described in this document makes it possible to obtain a beam of photons the wavelength of which is of 2.9 Angströms. Nevertheless, the system described exhibits the major following drawbacks:
the energy of photons is fixed,
the beam can neither be controlled in divergence, nor in number of photons, nor in pulse duration,
the time synchronization cannot be controlled,
it requires the use of a xenon fluoride gas exciter laser operating at a wavelength of 248 nm, that could be hardly used outside a dedicated research laboratory.

More generally, the drawback of such laser systems is the inability to reach the spectral X-ray field, but that of XUV rays, in other words, the far ultra-violet X-rays field. Thus, a general issue in this field is to generate a laser beam of which photons may have an energy higher than a typical threshold value in the range of X-rays, for example of 500 eV, i.e., a wavelength of less than 2 nm. Another general issue in this field is the time synchronization of the X laser beam, which can generally be only defined, at best, to within a few hundred femtoseconds.

In order to resolve the abovementioned problems, it has been proposed to implement free electron lasers in Compton regime, based on the use of an electron accelerator coupled with an undulator type structure, able to cause a transverse waviness of electrons. [C. Pellegrini, "Design considerations for a SASE X-ray FEL", Nucl Inst Meth. A 475 (2001) 1-12]. According to a first alternative of an X-ray free-electron laser, the accelerator causes the electrons to reach energies of 10 GeV and the undulator is a magnetic undulator. This alternative does not however make it possible to attain high X photons energies, ideally clearly higher than 10 keV, while having a significantly reduced cost and bulk.

According to a second alternative of X-ray free-electron laser, the accelerator causes the relativistic electrons to reach energies of around 10 and 100 MeV and the undulator is a laser propagating in the opposite direction to the propagation direction of the relativistic electron packet. This alternative has several major drawbacks. The first is that it requires "delta-gamma/gamma" energy dispersions of the packet electrons which are extremely low (substantially lower than 1%). A second is that it results in very low standardized emittances of the electron packet (substantially lower than 1 mm·mrad). Another difficulty is to achieve a rigorously constant laser illumination in the interaction area (relative illumination variations typically substantially lower than 1%), without a simple possibility of finely controlling the distribution of laser illumination in this area.

Another technical solution to create high flux X-ray beams [Z. Huang and R. D. Ruth "Laser-electron storage ring". Physical Review Letters, 80(5):976-9, February 1998] would be to use a device comprising a ring for storing relativistic electrons, or a set of one or two energy recovery linear accelerators, coupled with an active or passive laser cavity, in the form of a high-finesse Fabry-Pérot resonator. This compact light source device is also called Fabry-Perot synchrotron. However, this solution has major drawbacks. The first is that the X-radiation is very hardly tunable, i.e., that it is very difficult to modify the energy of the X photons. A second drawback results from the fact that this source does not have its eigen spatial or temporal coherence, outside the spatial coherence induced by the possible free propagation of the beam. Another drawback is the duration of the obtained X pulses, typically around 1 to 10 picoseconds.

Thus, none of the prior art solutions makes it possible to provide laser beams in the far ultraviolet field or X rays which are tunable, have low pulse duration (for example of around 5 to 100 femtoseconds), for a reasonable cost and bulk. Moreover, no prior art known solution makes it possible to provide laser beams in the hard X-ray field (higher than or much higher than 10 keV), or Gamma rays (much higher than 100 keV).

The aim of the present invention is to overcome the deficiencies and drawbacks of the above prior art, by allowing the production of a beam of photons in the spectral fields of the far ultraviolet, X rays and gamma rays, based on a particular interaction between a relativistic packet of electrons and a laser undulator beam from a specific superposition. To this end, the object of the invention is a free-electron laser system such as previously described, wherein the undulator beam results from the superposition, at an interaction area traversed by the propagation direction of the packet of relativistic electrons, of at least two laser beams propagating in directions different from each another, each direction having at least a non zero component in the plane orthogonal to the propagation direction of this packet. The laser beams interfere with each other such as to create a periodic light potential, the minima of which are parallel to the propagation direction of the electrons.

The solution relies on the use of a laser undulator type undulator, wherein the undulator results from the superposition of at least two laser beams. The polarization vectors of these beams make it possible to establish interference fringes such that the energetic potential—called ponderomotive potential—imposed on the relativistic electrons by the laser illumination exhibits oscillations in at least a direction orthogonal to the propagation direction of the relativistic electrons. In these conditions, the relativistic electrons may be trapped in at least a transverse direction by the ponderomotive potential by "Kapitza-Dirac" effect in intense field.

When, in addition, the polarization of the lasers comprises a non-zero common component in a direction orthogonal to the movement direction of the electrons, then a short wavelength radiation beam is formed in the propagation direction of the electrons by:

diffusion of the laser photons on the relativistic electrons with a high spectral shifting through Doppler-Fizeau effect, and amplification of the first photons diffused by stimulated Raman effect.

According to a particular embodiment of the invention, the beam undulator results from the superposition of two laser beams. In this last case, it may be advantageous, in order to optimize the free-electron laser beam at the output of the system, that the two laser beams be provided such that they propagate in opposite directions and, in addition, that the two laser beams propagate in directions that are perpendicular to the packet propagation direction. Preferably, the packet generating means and the undulator beam generating means are synchronized. Preferably, the undulator beam generating means comprises a laser source the original beam of which is cut such as to form the laser beams.

According to alternative embodiments of the system:

the wavelengths of at least two laser beams are located in the near infrared field (800 nm to 1.05 μm), the wavelengths of at least two laser beams are located in the mean infrared field (1.1 μm to 10 μm).

According to alternative embodiments, the relativistic electron packet generating means may comprise:

either a LINAC RF (acronym of "radio frequency linear accelerator", or a plasma wake laser accelerator, or an electron storage ring.

According to a particular embodiment, the laser beams propagate in an inhomogeneous wave geometry corresponding to a spatial and temporal patterning such that the locus of the maximum energy of each laser beam exhibits an angular shift with respect to the phase fronts in the interaction area.

Preferably, the laser beams are confined inside an optical resonant cavity. According to alternative embodiments, the system comprises:

phase front controlling means, and/or spectral phase controlling means.

The present invention also relates to a method for generating a free-electron laser beam. This method comprises a step of generating a packet of relativist electrons capable of propagating in a propagation direction and a step of generating an undulator beam capable of interacting with the relativistic electrons packet. It also comprises, such as to generate the undulator beam, a prior step, at an interaction area traversed by the propagation direction of said packet, of interfering at least two laser beams propagating in different directions and each of which having at least one non-zero component in a plane orthogonal to the propagation direction of said packet, a step of trapping relativistic electrons in the interference fringes of the undulator beam by injection at the input of the interaction area, and a step of amplifying in the undulator of a beam resulting from the diffusion of the lasers on the relativistic electrons.

BRIEF DESCRIPTION OF THE DRAWINGS

The invention will be better understood upon reading the detailed description of a non limitative embodiment, with the accompanying drawings respectively representing:

FIGS. 2A and 2B, diagrams illustrating different alternatives for superposing laser beams such as to generate the laser inverter;

DETAILED DESCRIPTION OF PARTICULAR EMBODIMENTS

Figure 1:
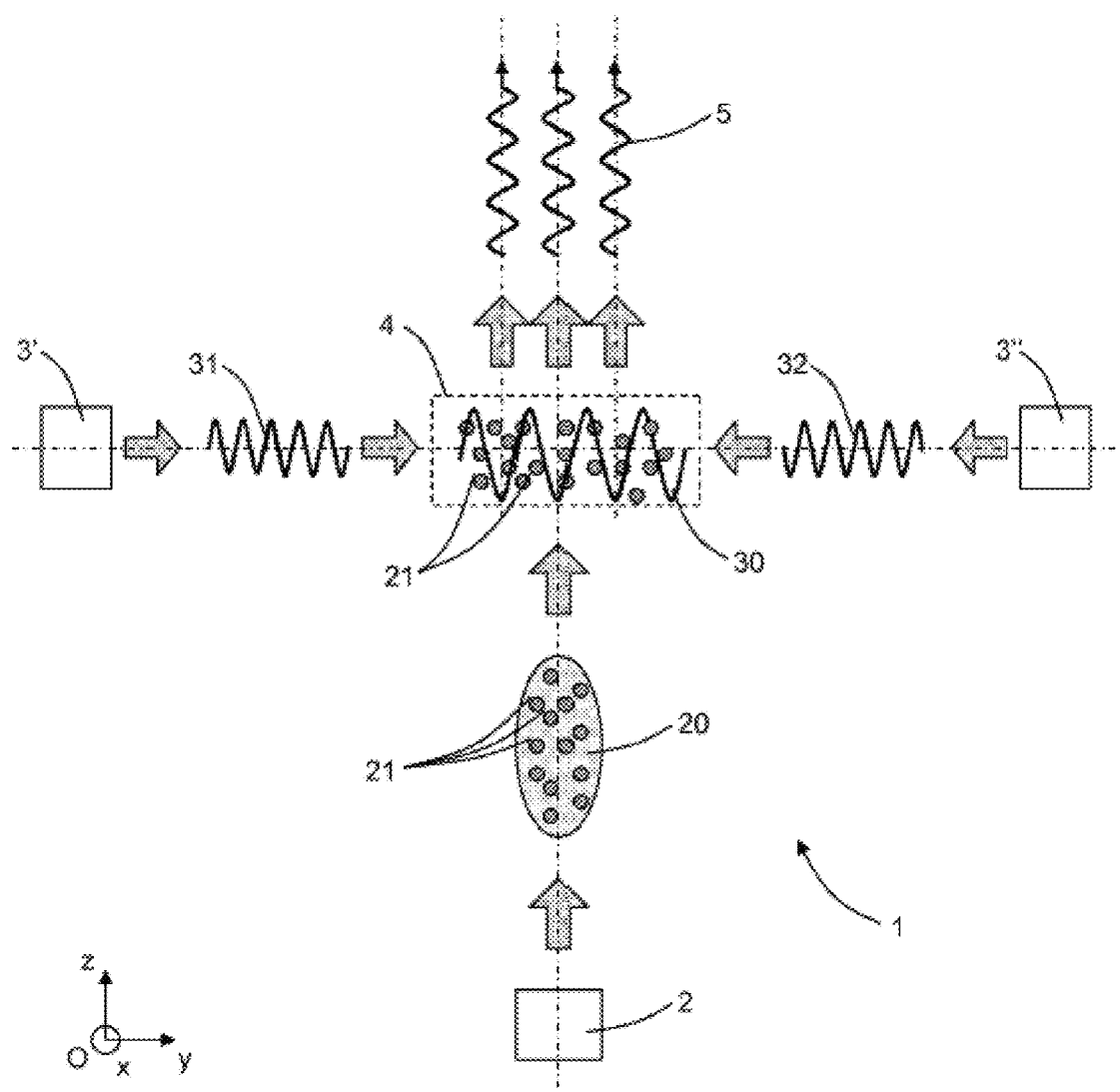
FIG. 1, a diagram of a free-electron laser system according to a first embodiment of the invention.

With reference to FIG. 1, a free-electron laser system, according to a first embodiment of the invention, comprises a generator 2 of a packet 20 of relativistic electrons 21, as well as an intense laser 3',3" synchronized to the electrons. The generator 2 makes it possible to generate a packet 20 having energy typically between 10 and 50 MeV. Higher energies are also possible, according to alternatives where it is required for example to couple the generator 2 to lasers in the mean infrared or reach the spectral range of very hard X-rays. In light of this energy, it is understood that the electron beam reaches relativistic speeds with a Lorentz factor γ typically higher than 2. According to the selected alternative embodiment, this generator 2 may be either a LINAC RF generator or a storage ring, or a plasma wake laser accelerator.

The packet 20 propagates along a propagation axis, which is represented in FIG. 1 by the Oz axis. It advantageously exhibits the lowest possible energy dispersion and standardized emittance. In the case of an embodiment where the generator 2 is a LINAC RF or a storage ring, the packet 20 is shaped by an adapted electronic focusing.

According to the preferred embodiment of the invention, the laser 3', 3" produces an original laser beam, which is cut into two identical portions 31 and 32, which propagate in opposite directions, in the Oy axis perpendicular to the Oz axis of propagation of packet 20. Means for directing the twin beams 31 and 32 are provided to superpose said beams on the path of relativistic electrons 21, i.e., at the Oz axis of propagation of electron packets 20.

The common polarization of the two beams 31 and 32 is made along axis Ox, respectively perpendicular to axis Oy of propagation of these two beams 31 and 32, and to axis Oz of propagation of the electron packets. The interference between these two beams forms an undulator 30. It results, by coherent diffusion of photons in the undulator, the production of a short wavelength laser beam 5, for example a nanometer. The polarization having a non-zero component outside plane (Oy, Oz) advantageously allows for the diffusion of photons.

In a manner that is equivalent to the preferred embodiment above, the propagation means of the two beams 31 and 32 is arranged to allow propagation of said beams according to an axis not parallel to Oy axis of FIG. 1, but always perpendicular to the propagation axis of the electron packet (Oz), with the understanding that axes Ox, Oy and Oz are only indicated on FIG. 1 as spatial reference titles for a better comprehension of the invention. Thus, the propagation axis of the two contra-propagating beams may be any axis belonging to plane xOy orthogonal to the packet propagation axis (Oz).

According to other alternative embodiments, the two beams each have at least a non-zero component in the xOy plane orthogonal to the Oz movement direction of the electrons, without however the twin beams moving along an axis perpendicular to the electron propagation axis. According to other alternative embodiments, the two beams are not contra-propagating with respect to each other, but their respective propagation directions have a non-null tilt.

Now are described different alternative embodiments for superposing laser beams such as to generate the laser undulator, with reference to FIGS. 2A and 2B. In the alternative embodiment illustrated by FIG. 2A, four beams 33, 34, 35 and 36 interact at a same area 4, on the path of the packet electrons 20, along the Oz axis. Beams 33 and 35, as well as beams 34 and 36, are contra-propagating, respectively on axes Ox and Oy.

In the alternative embodiment illustrated by FIG. 2B, two beams 37 and 38 interact at area 4. These beams do not propagate in opposite directions along the same axis, their respective directions exhibiting a non-null angle with respect to each other. Their propagation directions are not perpendicular to the propagation direction (Oz) of the electrons, but exhibit the same angle with respect to (Oz).

Several combinations of the above alternative embodiments, from the previous figures, are possible. The skilled person will understand through these different alternative embodiments that the present invention may be carried out based on a number of laser beams higher than two and propagating in directions non parallel to the propagation direction (Oz) of the electrons. Thus, if $\alpha$ is the angle formed between the laser beams and the propagation direction of the electrons, $\alpha$ ranges between $\arcsin(1/\gamma)$, strictly, and $\pi$ and is more particularly closer to $\pi/2$.

Physically, the operation of the described devices is based on the electromagnetic emission relating to the oscillation of electrons subjected to a double laser field, at the optical frequency. This emission appears in the laboratory repository with an important Doppler shift varying as 2 times the squared Lorentz factor ($2\gamma^2$), making it possible to reach the X-ray field. This emission is made coherent by a transverse gathering at the mixed frequency of the optical frequency and the well-bottom oscillation frequency. Put differently, it is achieved with a "Raman" type phenomenon with a coupling between an external high frequency excitation, the optical frequency and a low frequency oscillation, the well-bottom oscillation frequency, on the system's eigen model.

Figure 3:
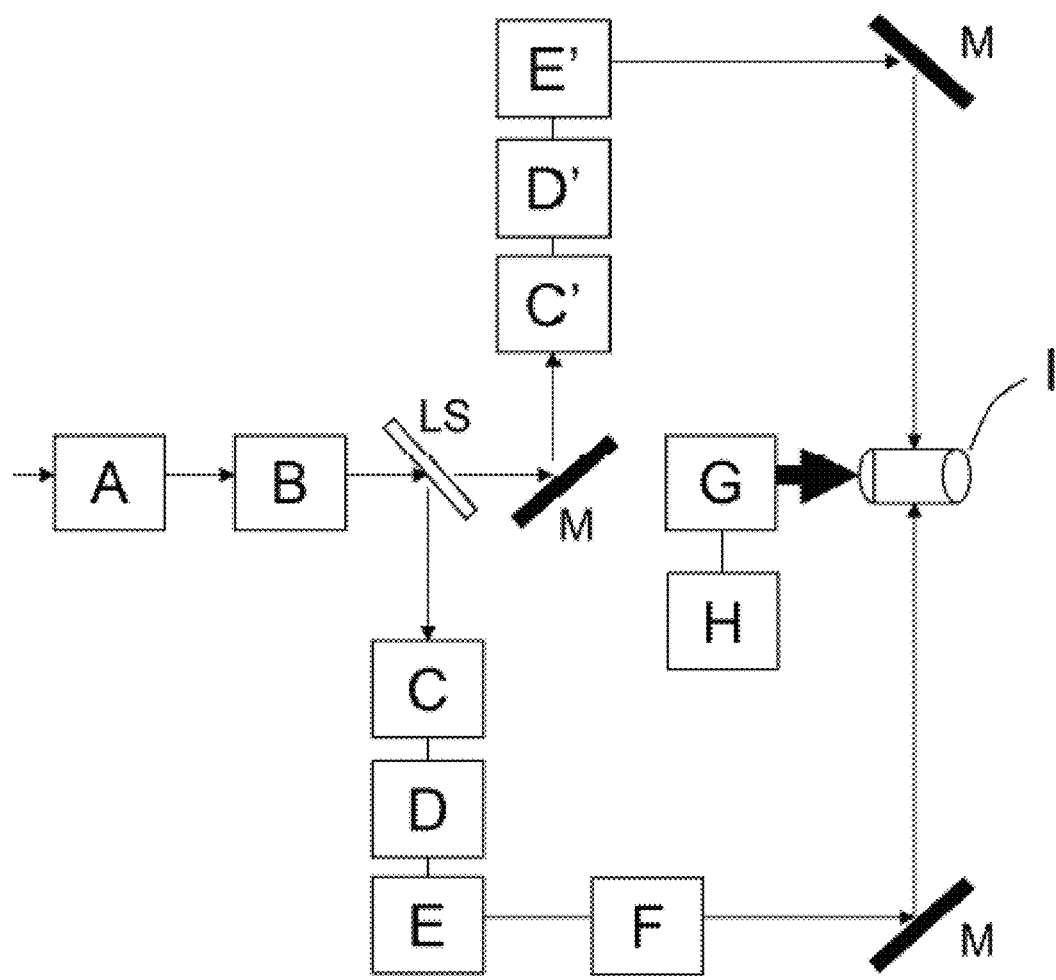
FIG. 3, a diagram illustrating an example of cutting a laser beam in two beams superposing in the interaction area.
Figure 4:
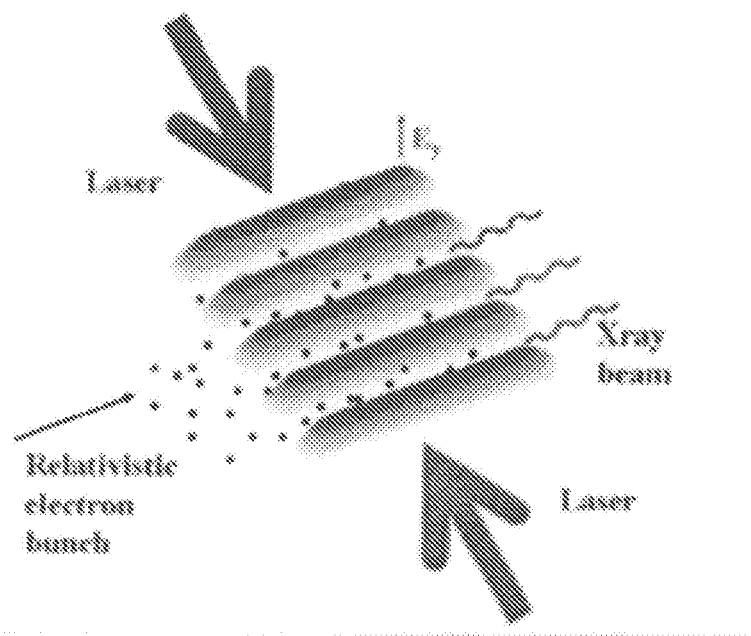
FIG. 4, an example three-dimensional depiction of interference fringes created by the interference between the two laser beams shown in FIG. 1.
Figure 5:
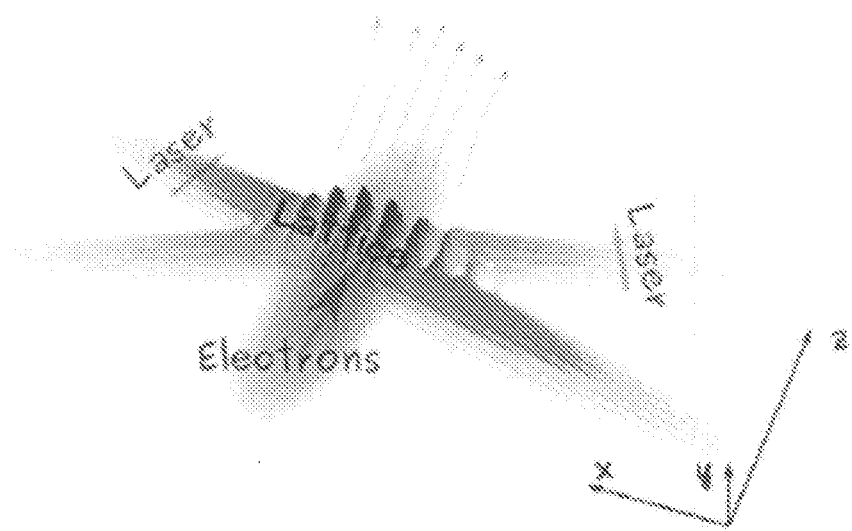
FIG. 5, an example three-dimensional depiction of interference fringes created by the interference between the two laser beams shown in FIG. 2B.

In the alternative illustrated by FIG. 3, the laser beam is first subjected to a spectral patterning by a device A, located at any appropriate location in the laser chain; then to a device B for spectral angular dispersion, in order to create a so-called "inhomogeneous" wave; then is cut into two identical beams by a separator blade LS. Each of the two beams thus passes through an imaging device C,C' in the plane of the figure, a spatial patterning device D, D', then a focusing device E, E' in the plane perpendicular to the figure. One of the beams has a temporal delay controlled by a device F. Both laser beams are combined in the interaction area I, wherein they jointly interact with a packet of electrons from an accelerator device G, itself triggered by a device H for synchronizing with the laser.

The method for generating a free-electron laser beam according to the invention thus comprises:
    a step of generating a packet 20 of relativistic electrons 21 capable of propagating in the propagation direction Oz,
    a step of superposing, at an interaction area 4 traversed by the propagation direction Oz of the packet 20, at least two laser beams 31 and 32 propagating in directions different from each other and different from the propagation direction Oz of the packet 20, such as to generate an undulator beam 30 capable of interacting with the packet 20 of relativistic electrons 21;
    a step of trapping relativistic electrons in the interference fringes of the undulator beam 30 by injection at the input of the interaction area 4, and
    a step of amplifying, in the undulator 30, the beam 5 resulting from the diffusion of lasers 31-32 on the relativistic electrons.

The aforementioned embodiments described in the present invention are given by way of non limitative examples. It is to be understood that the skilled person is likely to achieve different alternative embodiments of the invention without departing from the scope of the invention.

The invention claimed is:

1. A free electron laser system, comprising:
    a generator operably generating a packet of relativistic electrons capable of propagating in a propagation direction; and
    a laser operably generating an undulator beam capable of interacting with the packet of the relativistic electrons, the undulator beam resulting from an interference, at an interaction area traversed by the propagation direction of the packet, of at least two laser beams propagating in directions different from each other and each having at least a non-zero and counter-propagating component in a plane orthogonal to the propagation direction of the packet, wherein the at least two laser beams interfere with each other so as to create a periodic light potential, the minima of the periodic light potential being parallel to the propagation direction of the packet.

2. The laser system according to claim 1, wherein the undulator beam results from the superposition of the two laser beams.

3. The laser system according to claim 2, wherein the two laser beams propagate in opposite directions.

4. The laser system according to claim 2, wherein the two laser beams propagate in directions perpendicular to the propagation direction of the packet.

5. The laser system according to claim 1, wherein the generator operably generating the packet and the laser operably generating the undulator beam are synchronized.

6. The laser system according to claim 1, wherein the laser operably generating the undulator beam comprises a laser source of which original beam is cut such as to form the at least two laser beams.

7. The laser system according to claim 1, wherein wavelengths of the at least two laser beams are located in a near infrared field.

8. The laser system according to claim 1, wherein wavelengths of the at least two laser beams are located in a mean infrared field.

9. The laser system according to claim 1, further comprising at least a third beam trapping the relativistic electrons in the plane orthogonal to the propagation direction of the packet and throughout the interaction area.

10. The laser system according to claim 1, further comprising at least a device for spatially patterning the laser beams makes it possible to trap the relativistic electrons in the plane orthogonal to the propagation direction of the packet and throughout the interaction area.

11. The laser system according to claim 1, wherein the laser beams are confined inside an optical resonating cavity.

12. The laser system according to claim 1, further comprising phase fronts controlling means.

13. The laser system according to claim 1, further comprising spectral phase controlling means.

14. A method for generating a free-electron laser beam, the method comprising:
generating a packet of relativistic electrons capable of propagating along a propagation direction;
generating an undulator beam capable of interacting with the relativistic electron packet;
to generate the undulator beam, at an interaction area traversed by the propagation direction of the packet, interfering at least two laser beams, propagating in directions different from each other and each of which having at least one non-zero and counter-propagating component in a plane orthogonal to the propagation direction of the packet, with each other so as to create a periodic light potential, the minima of the periodic light potential being parallel to the propagation direction of the packet;
trapping relativistic electrons in the interference fringes of the undulator beam by injection at the input of the interaction area; and
amplifying, in the undulator beam, a beam resulting from the diffusion of the lasers on the relativistic electrons.

15. The laser system according to claim 1, wherein the propagation directions of the at least two laser beams are oriented at a non-zero angle with respect to each other.

16. The laser system according to claim 1, wherein the propagation directions of the at least two laser beams are oriented at a non-orthogonal angle with respect to the propagation direction of the packet.

17. The laser system according to claim 1, wherein the generator is a plasma wake laser accelerator.

18. A free electron laser system, comprising:
a generator operable to generate a packet of relativistic electrons that propagate in a propagation direction; and
a laser operable to generate an undulator beam that interacts with the packet of the relativistic electrons, the undulator beam resulting from an interference between at least two laser beams occurring within an interaction area traversed by the propagation direction of the packet, the at least two laser beams propagating in directions oriented at a non-orthogonal angle relative to the propagation direction of the packet, wherein the at least two laser beams interfere with each other so as to create a periodic light potential, the minima of the periodic light potential being parallel to the propagation direction of the packet.

19. The laser system according to claim 18, wherein:
one of the at least two laser beams is oriented at a first non-orthogonal angle with respect to a first path extending in the propagation direction of the packet from the generator to the interaction area;
the other one of the at least two laser beams is oriented at a second non-orthogonal angle with respect to the first path extending in the propagation direction of the packet from the generator to the interaction area; and
the first and second non-orthogonal angles are equal in magnitude and opposite in direction.

20. The laser system according to claim 19, wherein:
one of the at least two laser beams extends along a second path toward the interaction area;
the other one of the at least two laser beams extends along a third path toward the interaction area; and
the first path is disposed between the second and third paths.

21. The laser system according to claim 1, wherein:
the relativistic electrons are trapped in the interference fringes of the undulator beam by injection at the input of the interaction area; and
a beam resulting from the diffusion of the lasers on the relativistic electrons is amplified in the undulator beam.

22. The laser system according to claim 1, wherein the undulator beam oscillates about an axis that extends perpendicular to the propagation direction of the packet.

23. The laser system according to claim 1, wherein in the undulator beam, diffusion of laser photons on the packet of relativistic electrons produces a laser beam.

24. The laser system according to claim 23, wherein the laser beam propagates along a path that extends along the minima of the periodic light potential and parallel to the propagation direction of the packet.

25. The laser system according to claim 18, wherein:
the relativistic electrons are trapped in the interference fringes of the undulator beam by injection at the input of the interaction area; and
a beam resulting from the diffusion of the lasers on the relativistic electrons is amplified in the undulator beam.

26. The laser system according to claim 18, wherein the undulator beam oscillates about an axis that extends perpendicular to the propagation direction of the packet.

27. The laser system according to claim 18, wherein in the undulator beam, diffusion of laser photons on the packet of relativistic electrons produces a laser beam.

28. The laser system according to claim 27, wherein the laser beam propagates along a path that extends through the minima of the periodic light potential and parallel to the propagation direction of the packet.

* * * * *